United States Patent [19]

Petroff et al.

[11] Patent Number: 5,333,508
[45] Date of Patent: * Aug. 2, 1994

[54] VELOCITY MEASUREMENT SYSTEM

[75] Inventors: Alan M. Petroff; Larry W. Fullerton, both of Huntsville, Ala.

[73] Assignee: ADS Environmental Services, Inc., Huntsville, Ala.

[*] Notice: The portion of the term of this patent subsequent to Jul. 13, 2000 has been disclaimed.

[21] Appl. No.: 752,560

[22] PCT Filed: Oct. 5, 1990

[86] PCT No.: PCT/US90/05721

§ 371 Date: Sep. 10, 1991

§ 102(e) Date: Sep. 10, 1991

[87] PCT Pub. No.: WO90/05721

PCT Pub. Date: May 31, 1990

[51] Int. Cl.[5] ................................................ G01F 1/66
[52] U.S. Cl. ............................. 73/861.25; 73/861.18
[58] Field of Search ............. 73/861.18, 861.25, 861.26

[56] References Cited

U.S. PATENT DOCUMENTS

| | | | |
|---|---|---|---|
| 3,443,433 | 5/1969 | Liston et al. | 73/861.25 |
| 4,257,278 | 3/1981 | Papadofrangakis et al. | 73/861.25 |
| 4,391,148 | 7/1983 | Sainz et al. | 73/861.25 |
| 4,751,929 | 6/1981 | Hayakawa et al. | 128/663 |
| 5,020,374 | 6/1991 | Petroff et al. | 73/861.25 |

Primary Examiner—Richard E. Chilcot, Jr.
Assistant Examiner—R. Biegel
Attorney, Agent, or Firm—Brumbaugh, Graves, Donohue & Raymond

[57] ABSTRACT

A sonic-type fluid flow measuring system wherein reflections or echoes of an ultrasonic acoustic emitter (9) are sensed and typically comprise a number of frequencies representative of a number of discrete velocities of flow in a volume of fluid. As a sample, they simply appear as a voltage plot as a function of time and wherein the time width of a given signal excursion relates to the frequency of a given signal. Thereafter, this time domain signal sample is converted to a frequency domain sample whereby the presence and magnitude of each frequency component, or velocity component, is isolated, this being typically done by what is known as a Fast Fourier Transform. The highest frequency, velocity, signal from each of a rapid succession of samples is then obtained and stored in a memory (38). The highest and lowest of these are then discarded, and the remaining are averaged to obtain more likely representations of velocity. As the goal is to determine an average fluid velocity for a whole cross section of fluid flow, the measured peak velocity is a detected reference from which a lesser velocity, for example, 0.9, of it is chosen. To achieve a value for volume of flow, the average velocity is then multiplied by the cross-sectional area of the containment (8) through which flow occurs.

10 Claims, 4 Drawing Sheets

VELOCITY MEASUREMENT SYSTEM

FIELD OF THE INVENTION

This invention relates generally to devices and systems for the measurement of velocity of fluid flow, and more particularly to a system utilizing ultrasonic energy in combination with the Doppler effect as a means to quantify such velocity.

BACKGROUND OF THE INVENTION

There are many instances where it is necessary or desirable to determine the average velocity of a cross section of a fluid, particularly as flowing through some type of containment vessel. Average velocity is needed in such an instance in order to determine volume of flow, as by simply multiplying average velocity by the cross section of fluid. However, as is well known, the velocity of flow often varies within a discrete volume, particularly as between levels of a given cross section of it, making it difficult to determine the average velocity.

One prior system, which is described in U.S. Pat. No. 4,083,246, employs an electromagnetic sensor, this being placed in the flow stream typically near the bottom of a channel of flow. Its output varies as a function of a sensed electromagnetic field, sensing being limited to the region closely adjacent the sensor, and thus it senses the velocity at its particular level in the flow. In accordance with this patent, liquid level, height of liquid, must also be sensed and the output of the electromagnetic unit modified as a function of liquid height to obtain a velocity signal which it is asserted representative of average flow of the fluid in which the sensor is immersed.

A second type of flow velocity measurement device is of the Doppler shift type wherein an acoustic signal of a known frequency is emitted into a moving fluid, and reflected signals, particularly from objects in it, are sensed and their frequency compared with the emitted signal. With this method, a difference frequency or frequencies, Doppler frequencies, are thereby obtained, each representative of a discrete velocity. A modification of this approach employs several sensors, and their outputs are averaged.

One significant problem with electromagnetic type sensors is that accuracy often tends to fall off fairly rapidly with time of usage, particularly where there is any foreign matter which can adhere to the sensor. This is a significant problem in the case of usage in sewage lines.

A distinct problem with acoustic-type devices is that they respond to multiple acoustic reflections, each from a distinct floating object, particle, or other moving interface with the fluid, and as these reflectors may be moving at different velocities depending upon such variables as their height and/or other distance from a containment wall, a variety of velocity indicating signals are received. In the past, different approaches for selecting particular reflected Doppler signals as indicating velocity have been attempted. Perhaps the most prominent one has been that of choosing the signal having the greatest amplitude or the average frequency of several discrete highest amplitude signals. The problem with this approach is that there is no assurance that it is derived from a reflecting source or sources which yield a true average velocity. For example, the echo or echoes may be from a large object which is substantially submerged and is moving at a much less than average velocity. On the other hand, it, or they, may be from an object moving on the surface and thus at a higher than average velocity. Thus, this approach is inherently susceptible of significant inaccuracies.

It is, accordingly, the object of this invention to overcome the aforesaid and other problems relating to prior art devices and to provide an improved velocity measurement system which is significantly more accurate and reliable.

SUMMARY OF THE INVENTION

In accordance with this invention, a liquid velocity measurement system is constructed wherein an acoustic signal is Transmitted longitudinally or with longitudinal components into a volume of moving fluid. As acknowledged above, a typical result will be the occurrence of a variety of Doppler effected echoes. An acoustic signal receiver converts these into a composite, for example, electrical voltage, varying with time and wherein the shape of the resulting waveform is derived from the various Doppler reflected echoes from a multiplicity of objects or particles present in the fluid medium. This waveform is your conventional time domain waveform. Instead of, as in the past, attempting to derive an average velocity from a signal or signals which display a maximum amplitude, signals are detected in terms of their frequency and the range of frequencies determined or compared. From such, a frequency is selected as representative of average velocity. In accordance with features of this invention, the frequencies present from which the selection is made would be determined by coherent detection such as by a Fast Fourier Transform including a tranform from a chirp or varying frequency, signal component. From it, then, the average velocity signal would be chosen, typically one which was on the order of 90% of the peak velocity detectable. It is acknowledged that this 90% relationship has been both suggested and challenged by others. The advocacy of this figure as a quite close approximation is based on discoveries accomplished by the applicants during substantial experimentation.

As a means of enhancing the general accuracy of applicants' approach, and as a further feature of this invention, a number of selected velocities are obtained, theme being from successive data samplings; then, these are averaged. As still a further enhancement, any of the peak velocity signals falling outside a selected range would be discarded as erroneous and not averaged.

DESCRIPTION OF THE PREFERRED EMBODIMENT

Figure 1:
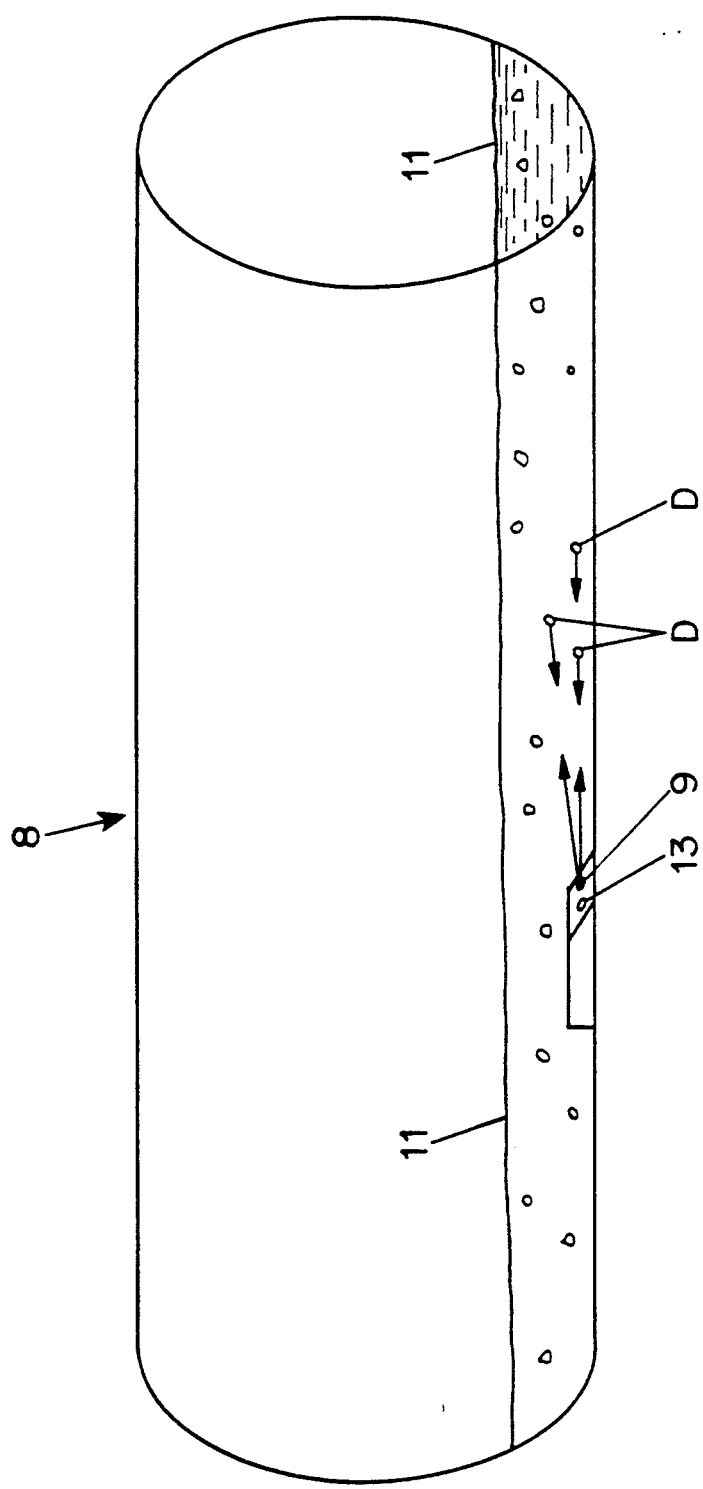
FIG. 1 is a schematic illustration of the employment of the present invention with respect to flow through a pipe.
Figure 2A:
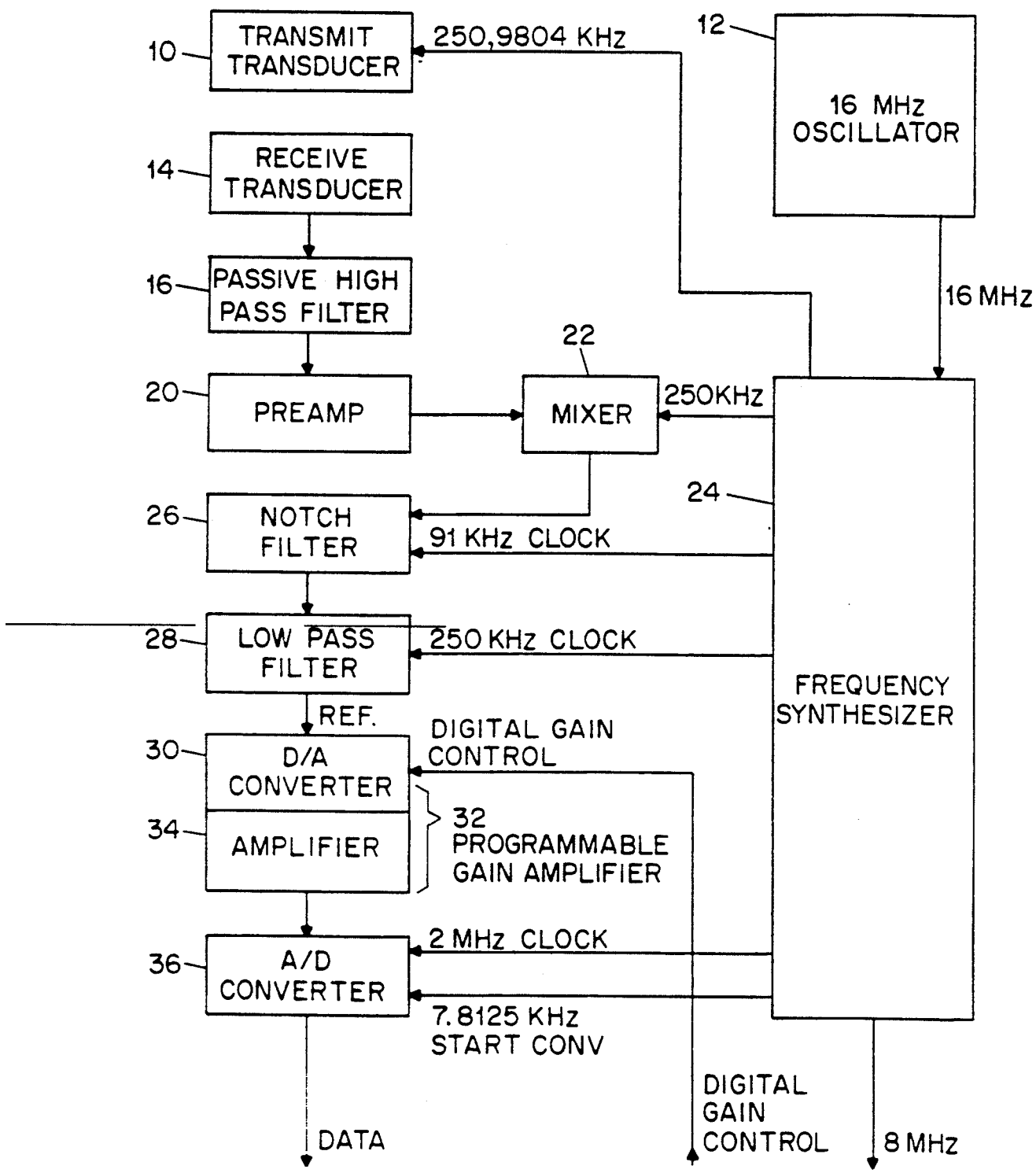
FIGS. 2a and 2b show an electrical block diagram of the system of this invention.
Figure 2B:
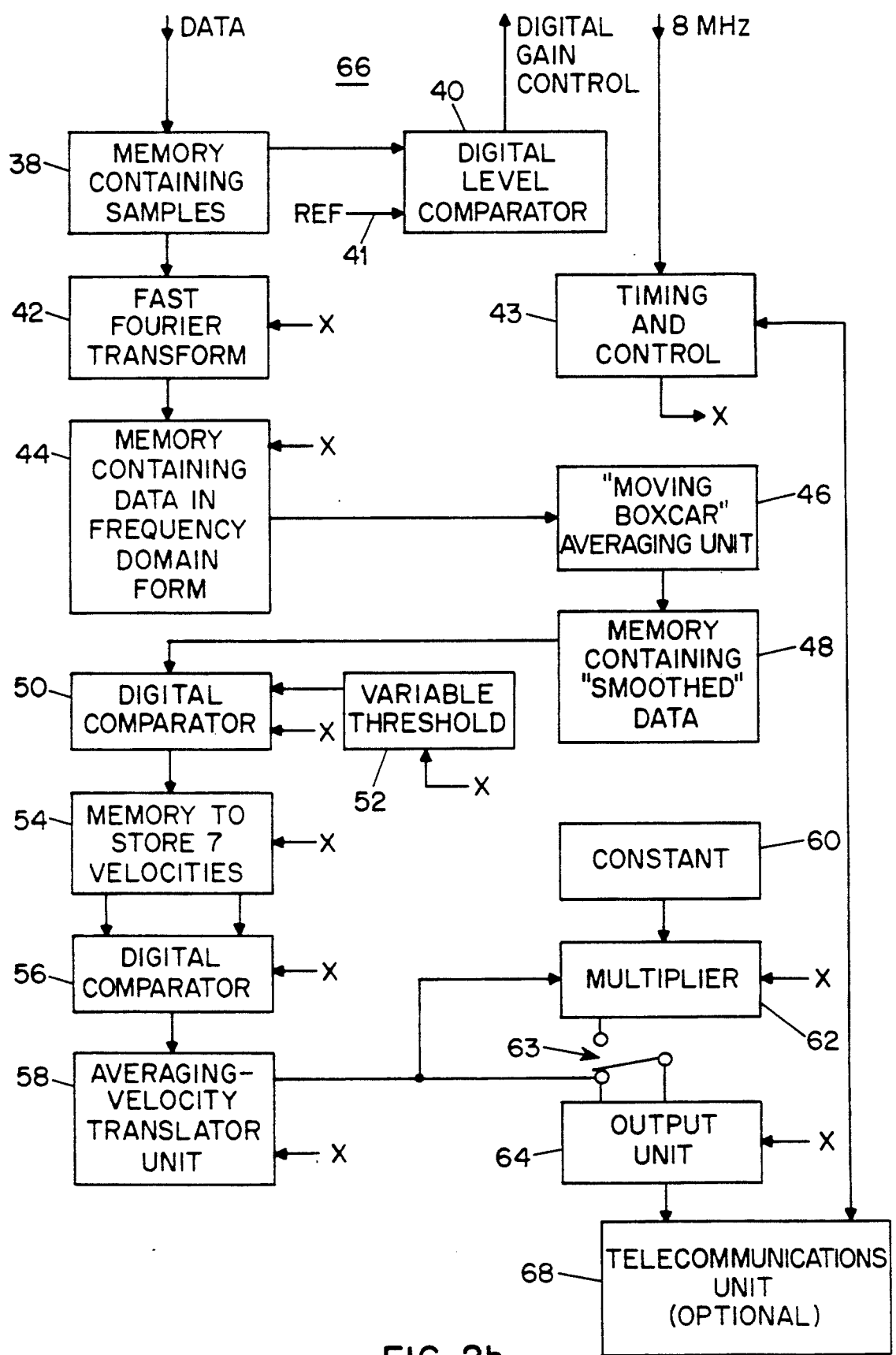

Referring first to FIG. 1, an emitting ultrasonic transducer 9 is positioned in housing 10 near the bottom of a sewer, storm, or storm-sewer pipe 8, being driven by a signal from frequency synthesizer 24, shown in FIG. 2a, and of a frequency of 250.9804 KHz. Typically, it propagates a signal generally longitudinally through a fluid 11.

Frequency synthesizer 24 is driven by 16 MHz pulse oscillator 12, and, in addition to the 250.9804 KHz signal, frequency synthesizer 24 provides a number of additional frequencies as required for the operation and control of the system. All of the frequencies provided by frequency synthesizer 24 are derived from the same 16 MHz clock and are therefore synchronous or coherent in nature. As a result, the system has a substantially improved capability of the detection processing of reflected Doppler signals of quite weak amplitudes.

Receive transducer 13, positioned alongside transmit transducer 9 in housing 10 in pipe 8, senses the various echoed signals; and by virtue of the velocity effects on them, they appear as signals differing from the frequency of the transmitted signal of 250.9804 KHz, being of a higher frequency (as shown) for flow toward the received transducer and of a lower frequency for flow away from it. The output of receive transducer 14 is passed through a simple R.C. type high-pass filter 16 which rolls off such as to remove any signal noise which may be present below a band around 250 KHz of interest. As the C or capacitor of the high-pass filter is in series with its output, this particularly prevents the passage of any non-informational low frequency signals.

The output of high-pass filter 16 is then fed to preamplifier 20 which amplifies a typically quite low level output from transducer 14, the output of preamplifier 20 being adjusted to have a peak-to-peak output as required by mixer 22 to which this output is fed. Mixer 22 is also fed a fixed clock signal of exactly 250 KHz from frequency synthesizer 24. Mixer 22 is a conventional four-quadrant multiplier-type mixer, and it functions to provide as an output a difference signal between the input signal and fixed clock signal of 250 KHz which is thus always equal, frequencywise, to a predetermined offset of 980.4 Hz plus a zero, positive or negative, Doppler shift, depending upon the velocity of flow of a debris source or sources D giving rise to an echo or echoes. This Doppler frequency shift is still very difficult to observe directly at the output of mixer 22. To understand this difficulty, It is well to regard the 980.4 Hz offset frequency as a carrier signal.

Significantly, with respect to the carrier signal, the Doppler shift, if present, serves to frequency modulate, or shift, it about its 980.4 Hz center frequency. However, at the output of mixer 22, the relative amplitude of the carrier is at least 100 times greater than any Doppler shifted frequencies which may be present along with it. This amplitude dominance of the carrier directly results from the close physical proximity of the transmit and receive transducers 9 and 13, respectively, which, while acoustically insulated, are housed in the same enclosure. The large relative amplitude of the carrier center frequency tends to effectively mask out, obviously weaker, signal echoes, particularly those from slowly moving objects as they will be represented by frequencies quite close to the carrier signal.

Significantly, the debris D providing the reflected signals, while moving with the fluid and thus providing velocity signals, often moves at different velocities by virtue of the fact that different portions of fluid moving in a pipe or other containment vessel vary in velocity, as discussed above. Therefore, multiple echoes are returned, as shown, to the receive transducer. This results in corresponding multiple Doppler signals which, combined, form a complex time domain signal or waveform as shown in FIG. 3, which the applicants have found does not lend itself directly to discrete velocity analysis.

Next, and in order to diminish the carrier effect, the output of mixer 22 is fed through an attenuating notch filter 26 which provides dramatic attenuation at the 980.4 Hz center or carrier frequency now present while simultaneously passing frequencies close on either side of it, these representing Doppler shift signals. Actually, notch filter 26 consists of two filters cascaded, that in series. One of the filters is a high-pass filter with a sharp roll-off at just above the carrier frequency, and the second filter is a low-pass filter with an equally sharp roll-off just below the carrier frequency. These filters are typically of the conventional capacitor-switched type and are switched by a 91 KHz signal from frequency synthesizer 24.

Figure 3:
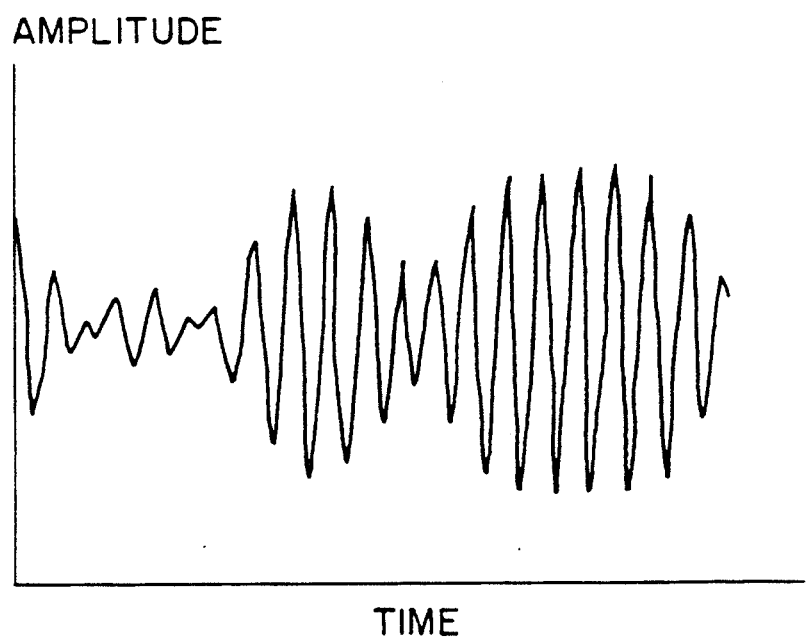
FIG. 3 is a plot of a time domain representation of the received signal after initial processing and as it might appear in memory 38.

By virtue of notch filter 26, Doppler signals are effectively separated from the carrier signal, these being represented by the complex time domain waveform of FIG. 3 which typically contains a group of Doppler shifted signals which have varying frequency and phase relationships.

The output of notch filter 26 is fed through low-pass filter 28 which is employed as an anti-aliasing filter and functions to limit the bandwidth of all signals to between 0 Hz and approximately 2,500 Hz, the range of interest and a compatible range for signal handling by A/D converter 36. This filter functions to prevent aliasing by sharply rolling off any frequency content above 2500 Hz and is a capacitor switch filter controlled by 250 KHz control signals supplied from synthesizer 24.

Next, the output of low-pass filter 28 is fed to the reference input of D/A converter 30, and the output of D/A converter 30 is fed to the input of amplifier 34. D/A converter 30 and following amplifier 34 make up a programmable gain amplifier 32 which effect either gain or attenuation as a function of a digital control signal derived, as will be explained. The output of programmable gain amplifier sampling from, and output of, being controlled by 2 MHz and 7.8125 KHz signals from frequency synthesizer 24. The latter frequency is the sample rate of A/D converter 36, and its output is fed to time domain memory 38 of digital signal processor 66, shown in FIG. 2a.

Digital signal processor 66 transforms a continuously updated signal train made up of a composite of received Doppler signals into a signal representative of the average velocity of flow being monitored. All of the signals processed within digital signal processor 66 are represented in binary word form. In addition, digital signal processor 66 monitors the amplitude of the signals being supplied it and provides a digital feedback loop to D/A converter 30 to maintain the range of signal amplitude supplied memory 38 to within a desired amplitude range for further processing. To accomplish this, digital level comparator 40 monitors the peak voltage as represented by a binary value in memory 38. If the peak voltage exceeds approximately 80% of the full scale range as fixed by digital threshold reference value 41, then the output gain is reduced by a fixed percentage. This process is repeated until the input voltage does not exceed the threshold.

The processor elements of digital processor 66 are timed and controlled by conventional timing and control circuitry 43, in turn controlled by a master 8 MHz signal from frequency synthesizer 24. Typically, timing and control 43 would be within, or controlled by, a microprocessor, as in the case of other elements of the system. The control Is symbolized by X labeled outputs of timing and control 43 and X inputs of the other components of the system as shown.

FIG. 3 is a plot of amplitude versus time of a signal train, for example, of 150 samples, contained in memory 38, thus illustrating the composite Doppler signals in conventional time domain form.

Figure 4:
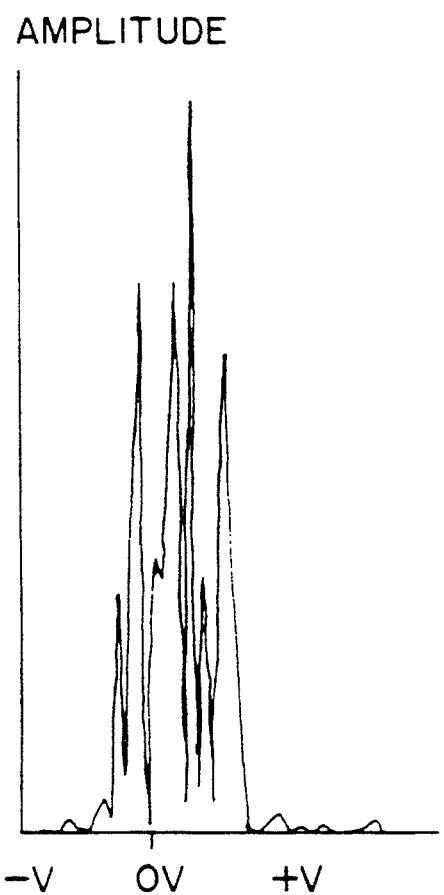
FIG. 4 is a plot of amplitude versus frequency after a Fast Fourier Transform as it might appear in memory 44.

As a feature of this invention, the time domain waveform, now in memory 38, is supplied, sample by sample, from memory 38 to Fast Fourier Transform unit 42. The Fast Fourier Transform unit 42 translates the time domain waveform, sample by sample, to a frequency domain one, as illustrated in FIG. 4 where frequency is plotted versus amplitude. The frequency domain waveform is stored in frequency domain memory 44. Each memory address corresponds directly to a discrete frequency, and each memory location is supplied and contains a numerical value representing the relative amplitude of that particular frequency. In this manner, we obtain discrete signals representative of a group of particular frequencies and thus velocities. The group is then representative of a frequency spectrum.

Figure 5:
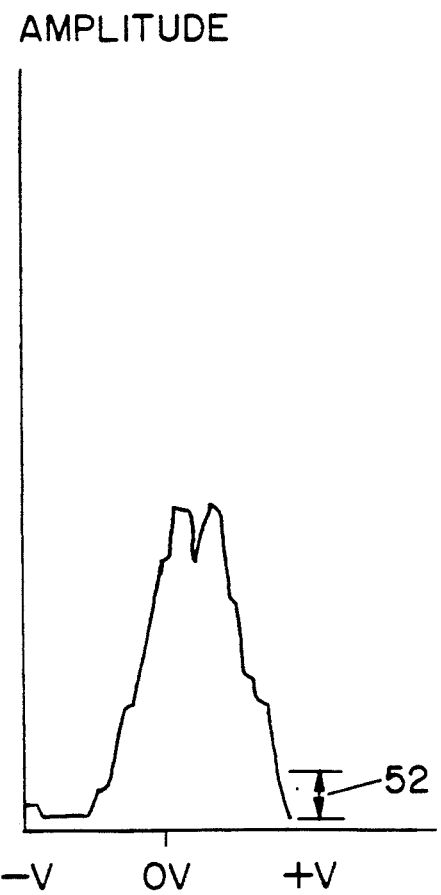
FIG. 5 is a plot of a smooth version of the waveform of FIG. 4 as it might appear in memory 48.

The discrete component frequencies within this spectrum typically exhibit a high degree of amplitude variance. As a means towards reliably determining the peak frequency, or near peak frequency, the curve of this data in frequency domain memory 44 Is "smoothed" by averaging unit 46 using a process known as a "moving boxcar averaging," and the result is shown in FIG. 5. In this averaging process, the first 10 amplitude values stored in frequency domain memory 44 are averaged, resulting in a new average amplitude value, which is then stored in the fifth location of memory 48. Next the 2nd . . . 11th amplitude values in frequency domain memory 44 are averaged, and this result is stored in the sixth location of memory 48. This process continues in a successive manner with the averaging of the 3rd . . . 12th, 4th, . . 13th, . . . , (n-9) . . . nth amplitude values found in memory 44. The process is completed when all results have been stored in memory 48.

Memory 48 Is arranged such that memory locations are assigned on a progressive frequency basis, for example, the first memory location would contain the amplitude of the lowest anticipated frequency, for example, 480.4 Hz, whereas the last memory location would store the amplitude of the highest anticipated frequency, for example, 2480.4 Hz. This frequency range corresponds to a velocity range of −5 feet per second to +15 feet per second.

As a feature of this invention, the applicants are seeking to identify the highest, or a selected near highest, frequency, for example, 0.9 of the highest frequency. This selection is made by examination from low to high of the stored frequencies; and where a dropout occurs, that is, there is no frequency component present, it can be assumed that we have Just passed the highest frequency present.

One example of a system for determining such a selection is described as follows. First, selection is assisted by digital comparator 50 which progressively is furnished amplitude outputs as described from memory 48. A variable or controllable binary word reference value is also provided digital comparator 50, this being from variable threshold source 52. For example, taking into account that there probably will always be some noise level which should be ignored, this reference would be of at least a minimum value such that when it is compared with an amplitude value from memory unit 48, an accurate indication of real frequency cutoff is indicated by the comparison process of digital comparator 50. Similarly, where any desired percentage, for example, 90% of peak velocity sensed, is desired as a readout, the value of variable threshold 52 would be adjusted accordingly. The cutoff criteria for such a percentage point would be determined as follows.

In order to accurately identify the peak velocity present in the flow, we must be able to select a low amplitude high frequency component within an environment of low amplitude noise as illustrated in the rightmost portion of the graph of FIG. 5. To determine the exact point where the signal ends and the noise begins, we use variable threshold 52. By adjusting the threshold at some critical value, we can discriminate between ambient noise and the highest present frequency component which directly represents the peak velocity. Because of the inherent noise factor, it may not be possible to reliably select the absolute highest frequency. However, by downwardly adjusting threshold 52, we can reliably select some frequency which is marginally less than the absolute high frequency corresponding to peak velocity of flow. This selected value, if chosen, is highly representative of the absolute peak velocity of flow. Since the average velocity of flow is approximately 0.9 of the peak velocity, we can obtain, by further downward adjustment of threshold 52, a reliable and reproducible means of determining average velocity of flow. The adjustment of variable threshold 52 can be performed manually in the field or remotely by a central computer via telecommunications unit 68 and timing and control 43.

It should be noted at this point that Doppler frequencies and velocities have been directly related based on signal paths being generally parallel with the direction of flow as illustrated in FIG. 1. In the minority of cases, where one encounters relatively full flows in relatively large pipes, signal propagation may be at some significant angle with respect to the line of direction of flow. In such case, two compensation approaches are possible. In one, variable threshold 52 would be adjusted upward, and in the other, averaging-velocity translation unit 58 would provide an adjustable translation factor. In both cases, the adjustment would be in terms of the cosine of the angle below the line of signal propagation and line of flow.

The process Just described of determining peak or near peak velocity value is repeated, for example, six times, to provide a total of seven velocity values as determined by digital comparator 50 under the control of timing and control 43. These seven velocity values are stored in memory 54. Then, as a further means of enhancement of accuracy, likely spurious, anticipated out-of-range or other extraneous measurements are discarded as determined by digital comparator 56, capable of cross-comparing all samples in memory 54. For example, the two extreme value samples would be discarded, and the remaining five measurement samples are averaged, this process being accomplished by averaging-velocity translator unit 58 to provide a selected velocity average value under the control of timing and control 43. In addition, unit 58 performs the actual translation from frequency in units of Hertz to velocity as represented in units of feet per second.

At this point, the output of averaging-velocity translator unit 58 may be alternately treated. In the event that a less-than-maximum velocity signal chosen as a threshold selection from variable threshold unit 52, the output of unit 58 will be in average velocity flow terms, and no further processing is needed. In such case, switch 63 would be positioned in the lower position wherein the output of unit 58 would be fed directly to output unit 64. This less-than-maximum velocity signal would reflect a fluid flow average velocity in terms of a chosen percentage of the peak velocity present.

Alternately, where the variable threshold is set to select the peak velocity signal, and the output of averaging unit 58 would reflect this, switch 63 would be positioned in the upper position wherein the output of averaging unit 58 would be supplied as one input to multiplier 62, in which case a reference value from constant unit 60, for example, a multiplier of 0.9, would be supplied from it as a second input to multiplier 62. By this approach, the average velocity signal is provided from the output of multiplier 62 to output unit 64.

Output unit 64 would, for example, be either a binary readout or simply an ASCII character string representation of the average velocity signal. Where simply a value, or where, in addition to other readouts, a value is present, representative of average velocity, it typically would be provided to a telecommunications unit 68 whereby the system as a whole would be controllable from a remote location via a telephone line or other communications carrier. Thus, the system may be maintained in a low power standby mode until it receives a "wake-up" call to initiate a fluid flow measurement by timing and control 43 to which telecommunications unit 68 is connected. The results of measurements may thus be returned.

Alternately, the results of a measurement can be stored in telecommunications unit 68 for later return by any of the above methods. Additionally, the telecommunications unit 68 is capable of receiving commands from a central computer site for the purpose of remotely configuring the velocity sensor unit or, optionally, dumping selected memory contents for further analysis via control of timing and control 43.

By the system thus described, there are provided fluid velocity measurements that are significantly more accurate and reliable than results previously obtained, actually, to within 0.04 feet per second. It is to be noted that as a function of the Doppler shift frequency spectrum, the velocity or flow rate may be positive, negative, or zero. It has been observed that a given reflected frequency will be shifted by approximately a positive 100 Hz for every foot of approaching fluid velocity (water as the fluid medium), and negative fluid velocity will result In a corresponding approximate negative 100 Hz frequency shift. It is to be kept in mind that the significant maximum velocity information may be derived from either end region of the frequency plots shown in FIGS. 4 and 5, the distance between the zero crossing of these plots being representative of the range of velocities present. If flow is opposite to the direction of ultrasonic propagation from transducer 9, the pertinent end region of the range would be the high frequency, or right-hand side, of one of these plots. If the direction of flow is reversed, it would be on the opposite, or low frequency, end of a plot.

While as illustrated the present system determines the presence of discrete frequencies by a Fast Fourier Transform, one might detect the generally multiple frequencies present by another form of spectrum analysis, such as by employment of an array or multiplexed frequency tuned phase lock loops or discrete filters. The significant thing is that the multiple echoes involved in processing signal flow will be taken into account as providing a total picture of velocities from which a velocity selection may be made as described.

We claim:

1. A fluid flow velocity measurement system comprising:
    acoustic emission means disposed within a body of moving fluid for transmitting an acoustic signal of a discrete frequency into a volume of moving fluid;
    acoustic reception means disposed within the body of moving fluid including a transducer position to receive a plurality of Doppler shifted signals of differing frequencies related to said acoustic signal from fluid borne objects, and said Doppler shifted signals being received over a discrete time interval and comprising a time domain signal train;
    frequency-responsive means responsive to said time domain signal train for detecting Doppler frequency shifted signals and producing a plurality of corresponding signals;
    signal-generating means responsive to said frequency-responsive means for generating a signal which corresponds to the frequency range of said Doppler frequency shifted signals; and
    velocity computation means responsive to said signal-generating means for providing an output signal representative of an average velocity of said fluid flow.

2. A system as set forth in claim 1 wherein the signal-generating means generates a signal which corresponds to the portion of the range of Doppler signals representing approximately 0.9 the highest velocity present.

3. A fluid flow velocity measurement system as set forth in claim 1 wherein said acoustic emission means and said acoustic reception means each comprises an acoustic transducer positioned within said fluid and generally positioned for transmission of signals having a significant component along the line of direction of flow.

4. A system as set forth in claim 1 wherein said frequency-responsive means comprises means for converting time domain signals into frequency domain signals.

5. A system as set forth in claim 4 wherein said means for converting time domain signals into frequency domain signals comprises means for effecting a Fourier Transform.

6. A system as set forth in claim 1 wherein said acoustic reception means includes means for maintaining the level of said Doppler shifted signals within a selected amplitude range.

7. A system as set forth in claim 1 wherein said acoustic reception means includes:
    an acoustic-electrical transducer;
    filter means responsive to said acoustic transducer for providing an output which is attenuated for the frequency of said acoustic signal and passes signals of frequencies differing from the frequency of said acoustic signal;

a digital-to-analog converter having a reference input connected to the output of said filter means and having a digital control input;

an analog-to-digital converting having an input responsive to the output of said digital-to-analog converter; and control means responsive to the output of said analog-to-digital converter for providing an input to said digital control input to said digital-to-analog converter, whereby the level of the output of said digital-to-analog converter is controlled.

8. A fluid flow velocity measurement system as set forth in claim 1 wherein said velocity computation means comprises means coupled to said signal-generating means for obtaining a plurality of selected Doppler frequency shifted signals and effecting an average of said last-named signals.

9. A system as set forth in claim 8 wherein said velocity computation means comprises means for obtaining a plurality of said Doppler frequency shifted signals and includes means for discarding selected extreme values as among said plurality of Doppler frequency shifted signals and obtaining an average velocity from of the remaining said signals.

10. A system as set forth in claim 9 wherein said velocity computation means comprises means for modifying the average from said remaining signal by a factor of approximately 10% and thereby providing a signal representing of said average velocity of fluid flow.

* * * * *

UNITED STATES PATENT AND TRADEMARK OFFICE
CERTIFICATE OF CORRECTION

PATENT NO. : 5,333,508
DATED : August 2, 1994
INVENTOR(S) : Alan M. Petroff et al.

It is certified that error appears in the above-identified patent and that said Letters Patent is hereby corrected as shown below:

Column 1, line 32: The word "asserted" should read --asserted is--.

Column 2, line 15: The word "Transmitted" should read --transmitted--; line 35: The words "chirp or" should read --chirp, or--; line 49: The word "theme" should read --these--.

Column 3, line 52: The word "It" should read --it--.

Column 4, line 18: The words "that in" should read --that is, in--; line 48: The word "amplifier" should read --amplifier 32 is fed to a conventional A/D converter 36, the--.

Column 5, line 10: The word "Is" should read --is--.

Column 6, line 56: The word "Just" should read --just--.

Column 7, line 59: The word "In" should read --in--.

Column 8, line 20: The word "position" should read --positioned--; line 33: The words "to the frequency range" should read --to a portion of the frequency range--; line 42: The words "0.9 the" should read --0.9 of the--.

Column 9, line 4: The word "converting" should read --converter--.

UNITED STATES PATENT AND TRADEMARK OFFICE
CERTIFICATE OF CORRECTION

PATENT NO. : 5,333,508
DATED : August 2, 1994
INVENTOR(S) : Alan M. Petroff et al.

It is certified that error appears in the above-identified patent and that said Letters Patent is hereby corrected as shown below:

<u>Column 10, line 8</u>: The words "from of" should read --from--.

Signed and Sealed this

Thirteenth Day of December, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,333,508

DATED : August 2, 1994

INVENTOR(S) : Alan M. Petroff et al.

It is certified that error appears in the above-indentified patent and that said Letters Patent is hereby corrected as shown below:

On the title page, item [*] Notice; Should be changed to read -- The portion of the term of this patent subsequent to June 4, 2008 has been disclaimed.

Signed and Sealed this

Fourth Day of July, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,333,508
DATED : August 2, 1994
INVENTOR(S) : Alan M. Petroff, et al.

It is certified that error appears in the above-indentified patent and that said Letters Patent is hereby corrected as shown below:

**On title page, item [*] Notice: should be changed to read --The portion of the term of this patent subsequent to June 4, 2008 has been disclaimed.**

Signed and Sealed this

Twenty-ninth Day of August, 1995

Attest:

BRUCE LEHMAN

*Attesting Officer*   *Commissioner of Patents and Trademarks*